(12) United States Patent
Hamada

(10) Patent No.: US 8,554,256 B2
(45) Date of Patent: Oct. 8, 2013

(54) RADIO BASE STATION AND COMMUNICATION METHOD

(75) Inventor: Seiji Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 13/048,249

(22) Filed: Mar. 15, 2011

(65) Prior Publication Data

US 2012/0064931 A1 Mar. 15, 2012

(30) Foreign Application Priority Data

Mar. 17, 2010 (JP) ................................ 2010-060769

(51) Int. Cl.
*H04W 72/04* (2009.01)

(52) U.S. Cl.
USPC ..................... 455/509; 455/232.1; 455/562.1; 370/329; 370/331; 370/350; 370/508

(58) Field of Classification Search
USPC ........................................................ 455/509
See application file for complete search history.

(56) References Cited

U.S. PATENT DOCUMENTS

| | | | | |
|---|---|---|---|---|
| 3,733,550 A | * | 5/1973 | Tazaki et al. | 375/288 |
| 4,122,448 A | * | 10/1978 | Martin | 342/174 |
| 4,285,058 A | * | 8/1981 | Fisher et al. | 370/491 |
| 4,539,707 A | * | 9/1985 | Jacobs et al. | 455/47 |
| 4,623,998 A | * | 11/1986 | Kobayashi et al. | 370/246 |
| 4,697,986 A | * | 10/1987 | David | 416/114 |
| 4,773,065 A | * | 9/1988 | Kobayashi et al. | 370/362 |
| 5,841,563 A | * | 11/1998 | Effenberger | 348/533 |
| 5,982,763 A | * | 11/1999 | Sato | 370/342 |
| 5,987,023 A | * | 11/1999 | Albrow et al. | 370/350 |
| 6,356,542 B1 | * | 3/2002 | Hayata | 370/342 |
| 6,363,128 B1 | * | 3/2002 | Isaksson et al. | 375/355 |
| 6,628,957 B1 | * | 9/2003 | Weaver et al. | 455/522 |
| 6,707,844 B1 | * | 3/2004 | Imaizumi et al. | 375/148 |
| 6,842,624 B2 | * | 1/2005 | Sarkar et al. | 455/522 |
| 6,934,553 B2 | * | 8/2005 | Kuroiwa et al. | 455/500 |
| 6,944,207 B2 | * | 9/2005 | Ohno | 375/148 |
| 6,952,455 B1 | * | 10/2005 | Banister | 375/267 |
| 7,003,100 B2 | * | 2/2006 | Lai et al. | 379/406.1 |

(Continued)

FOREIGN PATENT DOCUMENTS

| | | |
|---|---|---|
| JP | 2001-267961 | 9/2001 |
| JP | 2002-111548 | 4/2002 |

(Continued)

OTHER PUBLICATIONS

Lte™,"3rd Generation Partnership Project; Technical Specification Group Radio Access Network; (Release 8)", 3GPP TS 36.211 V8.9.0, Dec. 18, 2009.

(Continued)

*Primary Examiner* — Hai V Nguyen
(74) *Attorney, Agent, or Firm* — Fujitsu Patent Center

(57) ABSTRACT

A radio base station includes: an acquiring unit which acquires a pilot signal that is discretely included in a transmission signal to be transmitted from a mobile terminal and is referenced to adjust a transmission timing of the transmission signal in the mobile terminal; an adjusting unit which adjusts the transmission timing of the transmission signal in the mobile terminal based on the pilot signal; and a changing unit which changes an adjustment period in which the transmission timing is adjusted by the adjusting unit based on a transmission cycle of the pilot signal.

13 Claims, 11 Drawing Sheets

(56) References Cited

U.S. PATENT DOCUMENTS

| | | | |
|---|---|---|---|
| 7,095,990 B2* | 8/2006 | Kurihara | 455/130 |
| 7,107,027 B2* | 9/2006 | Zipper | 455/127.2 |
| 7,212,838 B2* | 5/2007 | Raghothama | 455/562.1 |
| 7,251,239 B2* | 7/2007 | Hasegawa | 370/342 |
| 7,336,627 B1* | 2/2008 | Hasegawa et al. | 370/282 |
| 7,352,717 B2* | 4/2008 | Knisely et al. | 370/329 |
| 7,460,829 B2* | 12/2008 | Utsumi et al. | 455/13.1 |
| 7,480,498 B2* | 1/2009 | Jin | 455/232.1 |
| 7,492,828 B2* | 2/2009 | Keerthi | 375/260 |
| 7,561,893 B2* | 7/2009 | Moulsley et al. | 455/522 |
| 7,567,781 B2* | 7/2009 | Chen et al. | 455/69 |
| 7,639,635 B2* | 12/2009 | Anderson et al. | 370/280 |
| 7,664,523 B2* | 2/2010 | Kaneko et al. | 455/522 |
| 7,692,587 B2* | 4/2010 | Rabinowitz et al. | 342/458 |
| 7,778,151 B2* | 8/2010 | Bertrand et al. | 370/208 |
| 7,826,370 B1* | 11/2010 | Vargantwar et al. | 370/235 |
| 7,865,158 B2* | 1/2011 | Bultan et al. | 455/192.2 |
| 7,881,182 B2* | 2/2011 | Hwang et al. | 370/208 |
| 7,890,115 B2* | 2/2011 | Feng et al. | 455/450 |
| 7,903,599 B1* | 3/2011 | Talley et al. | 370/318 |
| 7,929,467 B2* | 4/2011 | Mottier | 370/280 |
| 7,940,849 B1* | 5/2011 | Fang et al. | 375/260 |
| 8,014,730 B2* | 9/2011 | Moulsley et al. | 455/68 |
| 8,018,830 B2* | 9/2011 | Hofmann | 370/206 |
| 8,064,398 B2* | 11/2011 | Agashe et al. | 370/331 |
| 8,135,429 B2* | 3/2012 | Kuroda et al. | 455/522 |
| 8,165,148 B2* | 4/2012 | Jain et al. | 370/431 |
| 8,184,739 B2* | 5/2012 | Ohkawara et al. | 375/297 |
| 8,228,955 B2* | 7/2012 | Tamaki | 370/508 |
| 8,340,027 B2* | 12/2012 | Nanda et al. | 370/329 |
| 8,391,251 B2* | 3/2013 | Sun et al. | 370/329 |
| 8,406,158 B2* | 3/2013 | Mottier | 370/280 |
| 8,416,762 B2* | 4/2013 | Nanda et al. | 370/350 |
| 2002/0034215 A1* | 3/2002 | Inoue et al. | 375/147 |
| 2002/0054625 A1* | 5/2002 | Matsumoto et al. | 375/152 |
| 2002/0172308 A1* | 11/2002 | Harel et al. | 375/347 |
| 2003/0100281 A1* | 5/2003 | Zipper | 455/234.1 |
| 2004/0048593 A1* | 3/2004 | Sano | 455/323 |
| 2004/0203980 A1* | 10/2004 | Das et al. | 455/522 |
| 2004/0259597 A1* | 12/2004 | Gothard et al. | 455/562.1 |
| 2005/0099939 A1* | 5/2005 | Huh et al. | 370/210 |
| 2005/0143114 A1* | 6/2005 | Moulsley et al. | 455/522 |
| 2005/0282568 A1* | 12/2005 | Keerthi | 455/502 |
| 2006/0052139 A1* | 3/2006 | Teo et al. | 455/562.1 |
| 2006/0068732 A1* | 3/2006 | Jin | 455/232.1 |
| 2008/0014978 A1* | 1/2008 | Kaneko et al. | 455/522 |
| 2008/0080472 A1* | 4/2008 | Bertrand et al. | 370/344 |
| 2009/0104879 A1* | 4/2009 | Moulsley et al. | 455/68 |
| 2009/0209279 A1* | 8/2009 | Kuroda et al. | 455/522 |
| 2009/0232113 A1* | 9/2009 | Tamaki | 370/337 |
| 2009/0252028 A1* | 10/2009 | Hwang et al. | 370/210 |
| 2009/0262851 A1* | 10/2009 | Hoshino et al. | 375/267 |
| 2009/0268841 A1* | 10/2009 | Kim et al. | 375/267 |
| 2010/0002614 A1* | 1/2010 | Subrahmanya | 370/311 |
| 2010/0103906 A1* | 4/2010 | Montojo et al. | 370/335 |
| 2010/0135437 A1* | 6/2010 | Lee et al. | 375/324 |
| 2010/0150013 A1* | 6/2010 | Hara et al. | 370/252 |
| 2010/0254485 A1* | 10/2010 | Yoshii et al. | 375/295 |
| 2010/0260086 A1* | 10/2010 | Santhanam et al. | 370/311 |
| 2010/0260284 A1* | 10/2010 | Yoshii et al. | 375/295 |
| 2010/0284445 A1* | 11/2010 | Barriac et al. | 375/211 |
| 2010/0290545 A1* | 11/2010 | Kim et al. | 375/260 |
| 2011/0149814 A1* | 6/2011 | Mottier | 370/280 |
| 2011/0194432 A1* | 8/2011 | Kato et al. | 370/252 |
| 2011/0244887 A1* | 10/2011 | Dupray et al. | 455/456.2 |

FOREIGN PATENT DOCUMENTS

| | | |
|---|---|---|
| JP | 2004-72418 | 3/2004 |
| JP | 2004-165716 A | 6/2004 |
| WO | 2009-099931 A1 | 8/2009 |

OTHER PUBLICATIONS

Lte™, "3rd Generation Partnership Project; Technical Specification Group Radio Access Network; (Release 8)", 3GPP TS 36.213 V8.8.0, Sep. 29, 2009.

Ofuji, Yoshiaki et al., "Comparisons of Packet Scheduling Methods Focusing on Throughput of Each User in High Speed Downlink Packet Access", Technical Report of IEICE, Mar. 2002, pp. 51-58, English translation part, Section 2 L. 5 Right Col. pp. 52-L. 6 Left col. pp. 53.

Japan Patent Office; Office Action mailed Apr. 13, 2013 in connection with Japanese Patent Application 2010-060769; English-language Partial Translation.

Research in Motion Ltd., "SRS Transmission Timing during DRX", R2-081867, 3GPP, Apr. 4, 2008.

Research in Motion Ltd., "SRS Transmission Support in DRX Mode", R2-080808, 3GPP, Feb. 15, 2008.

NEC Group, "Discussion on Uplink Synchronization Maintenance", R1-072822, 3GPP, Jun. 29, 2007.

* cited by examiner

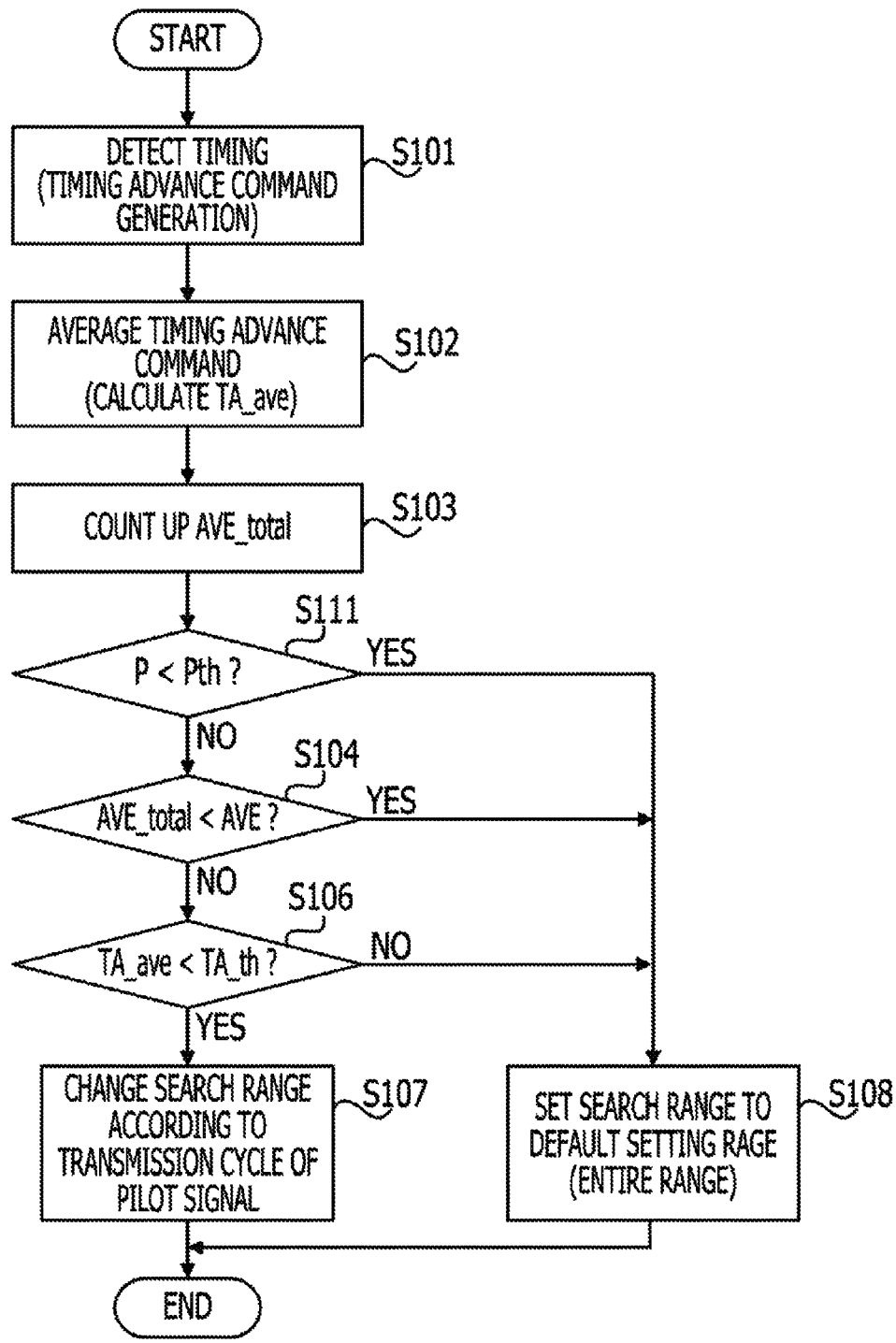

RADIO BASE STATION AND COMMUNICATION METHOD

CROSS-REFERENCE TO RELATED APPLICATIONS

This application is based upon and claims the benefit of priority from the prior Japanese Patent Application No. 2010-60769 filed on Mar. 17, 2010, the entire contents of which are incorporated herein by reference.

FIELD

The embodiments discussed herein are related to a radio base station that performs radio communication with a mobile terminal and to a communication method of the radio base station.

BACKGROUND

In a radio communication system, a plurality of radio base stations is located, and radio communication is performed between a mobile terminal (may be referred to as a mobile station) and a radio base station. Accordingly, the mobile station may transmit and receive various signals through the radio base station. The radio base station may communicate with a plurality of mobile terminals. Therefore, the radio base station is desired to process signals transmitted from the plurality of mobile terminals all at once.

To process the signals transmitted from the mobile terminals all at once, there is a method, for example, in which the radio base station receives a pilot signal transmitted from the mobile terminal and the radio base station generates delay profile information that is obtained by correlation processing between the pilot signal and a base signal for correlation. Specifically, for example, in a radio communication system complying with Long Term Evolution (LTE), a radio base station transmits a timing advance command (see TS36.213 4.2.3), which adjusts a transmission timing of a signal in each mobile terminal, to a mobile terminal based on the delay profile information. As a result, the transmission timing of the mobile terminals are adjusted. Accordingly, the radio base station may receive the signals from the plurality of mobile terminals at the same timing, so that the radio base station may process the signals from the plurality of mobile terminals all at once. On the other hand, for example, in a radio communication system complying with Code Division Multiple Access (CDMA), a radio base station may process the signals from the plurality of mobile terminals all at once by adjusting the timing for processing the signals received by the radio base station on the radio base station side based on the delay profile information.

Patent Document 1

Japanese Laid-open Patent Publication No. 2004-72418

Non-Patent Document 1

Ofuji Yoshiaki, "Comparisons of Packet Scheduling Methods Focusing on Throughput of Each User in High Speed Downlink Packet Access," Technical Report of IEICE, Institute of Electronics, Information and Communication Engineers, March 2002, RCS2001-291, p. 51-58.

SUMMARY

According to an aspect of the invention, a radio base station includes: an acquiring unit which acquires a pilot signal that is discretely included in a transmission signal to be transmitted from a mobile terminal and is referenced to adjust a transmission timing of the transmission signal in the mobile terminal; an adjusting unit which adjusts the transmission timing of the transmission signal in the mobile terminal based on the pilot signal; and a changing unit which changes an adjustment period in which the transmission timing is adjusted by the adjusting unit based on a transmission cycle of the pilot signal.

It is to be understood that both the foregoing general description and the following detailed description are exemplary and explanatory and are not restrictive of the invention, as claimed.

BRIEF DESCRIPTION OF THE DRAWINGS

FIG. 11 is a flowchart illustrating an example of a flow of processing (specifically, processing of a processing amount monitoring unit, the TAC averaging unit, and the search range setting unit) of the radio base station according to the second embodiment.

DETAILED DESCRIPTION OF THE PREFERRED EMBODIMENTS

Figure 1:
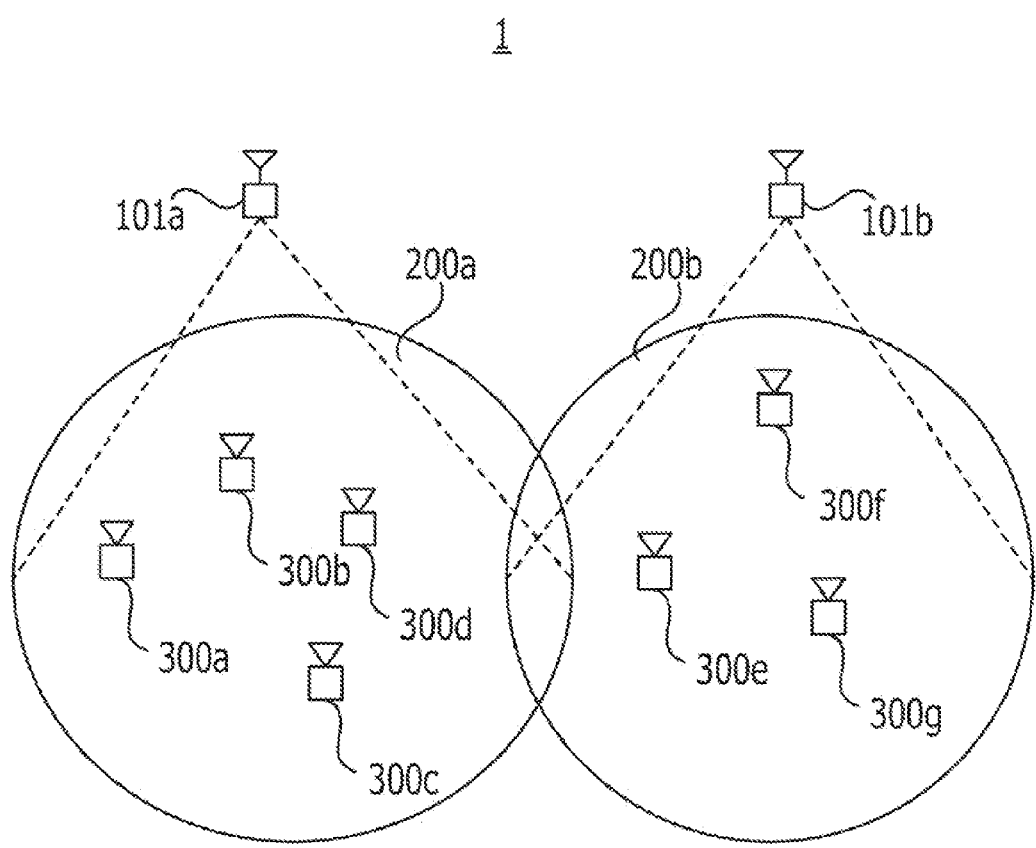
FIG. 1 is a block diagram illustrating an example of a configuration of a radio communication system according to a first embodiment.

Delay profile information is desired to be generated in each mobile terminal. If the number of mobile terminals performing communication with one radio base station is increased, processing for generating delay profile information (furthermore, adjustment of a transmission timing) is increased. Accordingly, there is a technical problem that the scale of a hardware configuration and consumption power of the radio base station may be increased.

The above-described problem is given as an example of the problems to be solved by the present embodiment. An aspect of the present embodiment is to provide a radio base station and a communication method that may decrease the processing load while adjusting the transmission timing of a signal in a mobile terminal, for example.

The above-described problem may be addressed by a radio base station that has an acquiring unit, an adjusting unit, and a changing unit. The acquiring unit acquires a pilot signal included in a transmission signal that is transmitted from a mobile terminal. The pilot signal is discretely included in the transmission signal. For example, if the transmission signal includes a plurality of frames, one or a number of pilot signals are included in each of a sequential number of the plurality of frames. The pilot signal is referred to by the radio base station to adjust the transmission timing (in other words, the transmission timing at which the mobile terminal transmits a transmission signal) of the transmission signal in the mobile terminal. The adjusting unit adjusts the transmission timing of the transmission signal in the mobile terminal based on the pilot signal. For example, processing for proceeding or delaying the transmission timing is given as an example of adjustment of the transmission timing. The changing unit changes an adjustment period in which the adjusting unit adjusts the transmission timing. Specifically, the changing unit may change the adjustment period based on a transmission cycle of the pilot signal (in other words, a reception cycle in which the radio base station receives a pilot signal).

The above-described problem may be solved by a communication method having an acquisition process, an adjustment process, and a change process. In the acquisition process, an operation equivalent to the operation performed by the above-described acquiring unit is performed. In the adjustment process, an operation equivalent to the operation performed by the above-described adjusting unit is performed. In the change process, an operation equivalent to the operation performed by the above-described changing unit is performed. The communication method is performed by the radio base station.

The above-described radio base station may change the adjustment period in which the transmission timing of the transmission signal in the mobile terminal is adjusted based on the transmission cycle of the pilot signal. Accordingly, if the adjustment period is changed to be shorter, the processing load (for example, a processing load related to the adjustment of the transmission timing or the like) of the radio base station may be decreased compared to the processing load of the radio base station that secures the longest adjustment period most of the time if not always. This may reduce the scale of the configuration of hardware and the power consumption of the radio base station.

According to the above-described communication method, an effect that is equivalent to the above-described radio base station may be achieved.

Embodiments will be described below with reference to the diagrams.

(1) First Embodiment

With reference to FIGS. 1 to 9, a radio communication system 1 according to a first embodiment will be described.

(1-1) System Configuration of Radio Communication

With reference to FIG. 1, an example of a configuration of a radio communication system 1 according to a first embodiment will be described. FIG. 1 is a block diagram illustrating an example of the configuration of the radio communication system 1 according to the first embodiment.

As illustrated in FIG. 1, the radio communication system 1 according to the first embodiment includes a radio base station 101*a*, a radio base station 101*b*, a mobile terminal 300*a*, a mobile terminal 300*b*, a mobile terminal 300*c*, a mobile terminal 300*d*, a mobile terminal 300*e*, a mobile terminal 300*f*, and a mobile terminal 300*g*. The number of the radio base stations 101 and the mobile terminals 300 illustrated in FIG. 1 is an example and is not limited to the number illustrated in FIG. 1. When the radio base station 101*a* and the radio base station 101*b* are described without being distinguished from each other, the radio base station 101*a* and the radio base station 101*b* are referred to as "radio base station 101" for convenience. Similarly, when the mobile terminals 300*a* to 300*g* are described without being distinguished from each other, the mobile terminals 300*a* to 300*g* are referred to as "mobile terminal 300."

The radio base station 101 is a radio base station (for example, an evolved NodeB (eNB)) that covers a cell 200 whose cell radius is approximately several kilometers to more than ten kilometers or several tens of kilometers. For example, as illustrated in FIG. 1, the radio base station 101*a* is a radio base station that covers a cell 200*a*, and the radio base station 101*b* is a radio base station that covers a cell 200*b*. The radio base station 100 performs radio communication with the mobile terminal 300 positioned inside the cell 200 that is covered by the radio base station 101. That is, the radio base station 101 establishes a communication connection with the mobile terminal 300 positioned inside the cell 200 covered by the radio base station 101 itself, and transmits and receives the data signal to and from the mobile terminal 300. The cell 200 covered by the radio base station 101 may have a configuration in which a part of the cell 200 overlaps a part or an entirety of another cell 200, or the entirety of the cell 200 does not overlap the other cell 200.

In the above description, the radio base station 101 that covers the cell 200 (that is, a microcell) with a radius of approximately several kilometers to more than ten kilometers or several tens of kilometers is described as an example. In addition to or instead of the radio base station 101, a radio base station that covers a cell (that is, a microcell) with a radius of approximately several hundreds of meters to one kilometer or a radio base station that covers a cell (that is, a femtocell) with a radius of approximately several meters to more than ten meters or several tens of meters may be located. There may be various radio base stations that cover a cell other than the cells with the radius of the above-described sizes. The example illustrated in FIG. 1 describes an example in which one cell 200 corresponds to one radio base station 101. A plurality of cells 200 (or sectors) may correspond to one radio base station 101.

The mobile terminal 300 is a mobile terminal (for example, User Equipment (UE)) that establishes a connection with the radio base station 101 that corresponds to the cell 200 inside which the mobile terminal 300 itself is positioned and that transmits and receives a data signal. A mobile phone and various information terminals (for example, a PDA, a mini personal computer, a laptop computer, and the like) with radio communication functions are given as examples of the mobile terminal 300. The mobile terminal 300 may use various services and applications (for example, a mail service, a voice communication service, a WEB browsing service, a packet communication service, and the like) through the radio base station 101 (furthermore, a core network or the like that is not illustrated may be coupled to a high order of the radio base station 101).

For example, a radio communication system complying with Long Term Evolution (LTE) or Evolved Universal Terrestrial Radio Access Network (E-UTRAN) is given as an example of the radio communication system 1. The radio communication system 1 may comply with an arbitrary specification other than LTE and E-UTRAN.

(1-2) Radio Base Station

Figure 2:
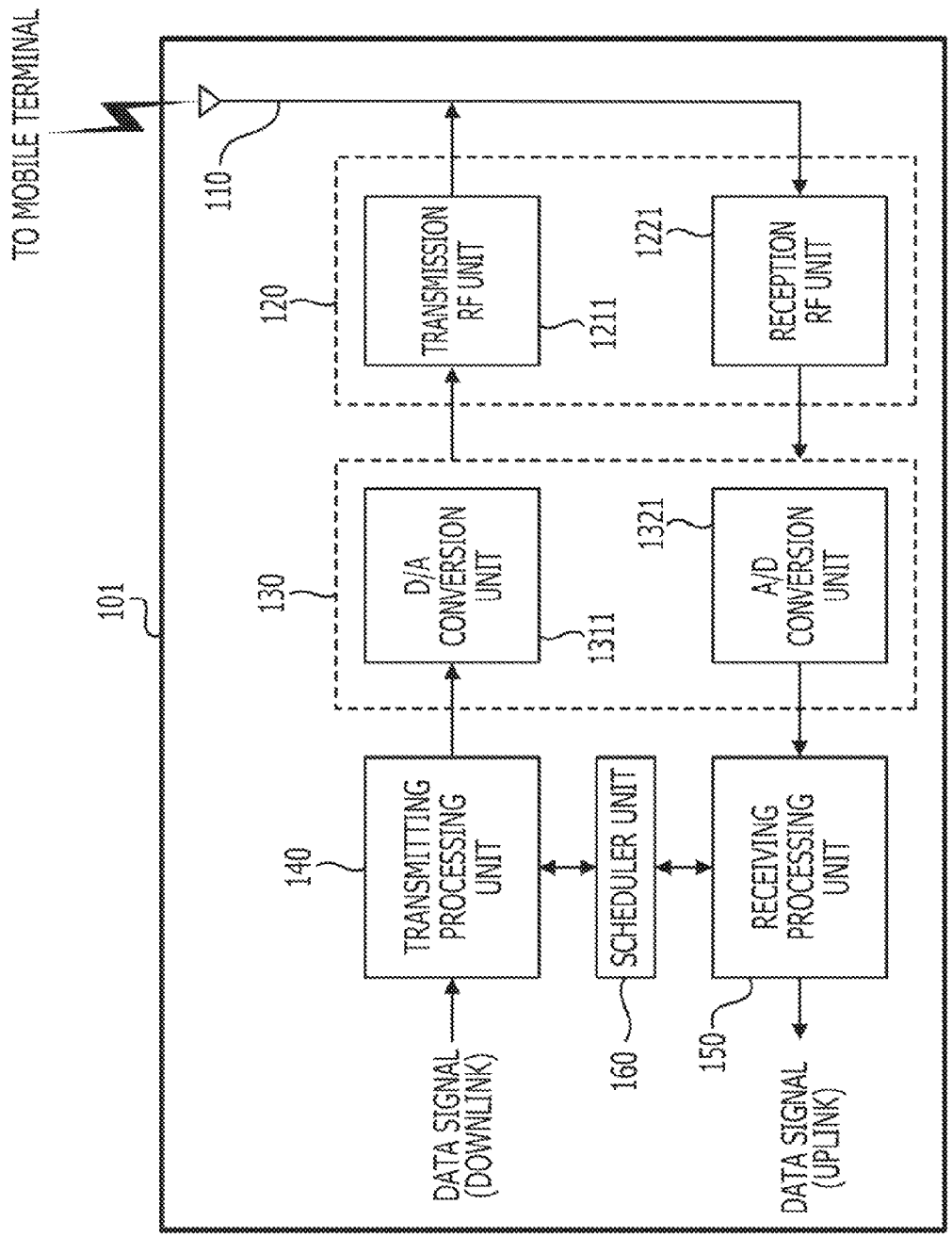
FIG. 2 is a block diagram illustrating an example of a configuration of a radio base station included in the radio communication system according to the first embodiment.

With reference to FIG. 2, the radio base station 101 provided in the radio communication system 1 according to the first embodiment will be described. FIG. 2 is a block diagram illustrating an example of a configuration of the radio base station 101 provided in the radio communication system 1 according to the first embodiment.

As illustrated in FIG. 2, the radio base station 101 includes an antenna 110, a Radio Frequency (RF) processing unit 120 having a transmission RF unit 1211 and a reception RF unit 1221, a conversion processing unit 130 having a Digital to Analog (D/A) conversion unit 1311 and an Analog to Digital (A/D) conversion unit 1321, a transmitting processing unit 140, a receiving processing unit 150, and a scheduler unit 160.

The transmitting processing unit 140 performs transmitting processing on a data signal (hereinafter referred to as "DL data signal") of a downlink transmitted from the radio base station 101 to the mobile terminal 300. Specifically, when the DL data signal is transmitted, the scheduler unit 160 selects the mobile terminal 300 that communicates with the radio base station 101. The scheduler unit 160 decides a demodulation method (a modulation method), a transmission rate, and the like to be used. The transmitting processing unit 140 performs modulating processing on the DL data signal based on a control signal output from the scheduler unit 160. The transmitting processing unit 140 outputs the DL data signal subjected to the modulating processing to the D/A conversion unit 1311. The D/A conversion unit 1311 converts the DL data signal as a digital signal into an analog signal and then outputs the DL data signal converted into the analog signal to the transmission RF unit 1211. The transmission RF unit 1211 performs radio transmitting processing on the DL data signal converted into the analog signal. Accordingly, a digital signal of a baseband frequency band output from the transmitting processing unit 140 is converted into an analog signal of a radio frequency band. After that, the DL data signal subjected to the radio transmitting processing is transmitted to the mobile terminal 300.

The receiving processing unit 150 performs receiving processing on the data signal (hereinafter referred to as "UL data signal") of an uplink transmitted from the mobile terminal 300 to the radio base station 101. Specifically, when the UL data signal is received, the scheduler unit 160 selects the mobile terminal 300 that communicates with the radio base station 101. The scheduler unit 160 decides the demodulating method (the modulating method), the transmission rate, and the like to be used. The reception RF unit 1221 performs radio receiving processing on the UL data signal received through the antenna 110 and then outputs the UL data signal subjected to the radio receiving processing to the A/D conversion unit 1321. The A/D conversion unit 1321 converts the UL data signal as an analog signal into a digital signal and then outputs the UL data signal converted into the digital signal to the UL receiving processing unit 150. The receiving processing unit 150 performs demodulating processing or the like on the UL data signal based on the control signal output from the scheduler unit 160.

From among the plurality of mobile terminals 300, the scheduler unit 160 may select the mobile terminal 300 that actually performs communication with respect to the uplink and the downlink, respectively. For example, the mobile terminal 300 that performs the communication is selected based on an index value calculated based on a line quality, a transmission rate, and the like. For selecting processing of the mobile terminal 300 by the scheduler unit 160, a known method may be used. Therefore, the detailed description is omitted to simplify the description.

Figure 3:
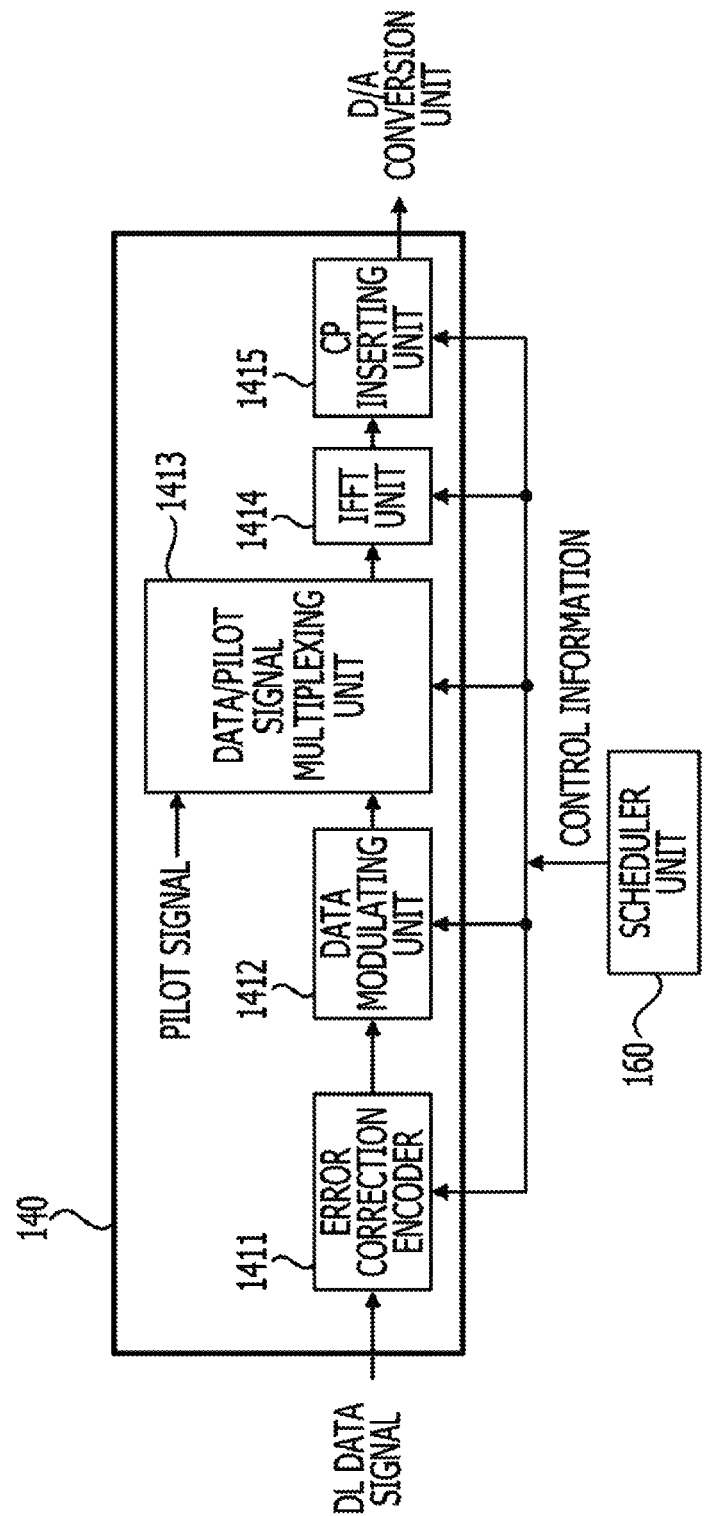
FIG. 3 is a block diagram illustrating an example of a configuration of a transmitting processing unit included in the radio base station according to the first embodiment.

With reference to FIG. 3, the transmitting processing unit 140 that performs the transmitting processing on the DL data signal will be described in detail. FIG. 3 is a block diagram illustrating an example of a configuration of the transmitting processing unit 140 included in the radio base station 101 according to the first embodiment.

As illustrated in FIG. 3, the transmitting processing unit 140 includes an error correction encoder 1411, a data modulating unit 1412, a data/pilot signal multiplexing unit 1413, an Inverse Fast Fourier Transform (IFFT) unit 1414, and a Cyclic Prefix (CP) inserting unit 1415. The transmitting processing unit 140 illustrated in FIG. 3 may be used as a transmitting processing 140 that is included in the radio base station 101 in the radio communication system 1 complying with LTE or Worldwide Interoperability for Microwave Access (WiMax) (that is, the radio base station 101 employing, for example, Orthogonal Frequency Division Multiplexing (OFDM) as a modulating method of a downlink) or may be used as a transmitting processing unit included in a radio communication system complying with another method.

The transmitting processing unit 140 performs the processing described below based on various control signals output from the scheduler unit 160. The error correction encoder 1411 performs error correction encoding processing on the DL data signal and then outputs the DL data signal subjected to the error correction encoding processing to the data modulating unit 1412. The data modulating unit 1412 performs modulating processing on the DL data signal subjected to the error correction encoding processing (for example, Quadrature Phase Shift Keying (QPSK) modulating processing or the like) and then outputs the DL data signal subjected to the modulating processing to the data/pilot signal multiplexing unit 1413. The data/pilot signal multiplexing unit 1413 time-multiplexes the DL data signal with a known pilot signal and then outputs the DL data signal time-multiplexed with the pilot signal to the IFFT unit 1414. The IFFT unit 1414 performs IFFT processing on the DL data signal that is time-multiplexed with the pilot signal by sample units of a prescribed number N (N is an integer of one or more). That is, the IFFT unit 1414 converts the DL data signal into a discrete time signal by considering the prescribed number of N of data samples as a sub carrier signal component and performing the IFFT processing on the sub carrier signal. The IFFT unit 1414 outputs the DL data, which was converted into the discrete time signal, to the CP inserting unit 61415. The CP inserting unit 1415 inserts a CP as a copy of an M sample (M is an integer if N is larger than M) in the latter part of the prescribed number N of data samples of the DL data signal subjected to the IFFT processing (that is, the DL data signal that is converted into a discrete time signal) into a head part of the prescribed number N of data samples. Since the CP is cyclically copied, the signals are consecutive in a (M+N) sample section into which the CP is inserted. Therefore, the CP plays a role of removing interference caused by a delay symbol from an adjacent path. The CP inserting unit 1415 outputs the DL data signal into which the CP is inserted to the D/A conversion unit 1311. As described above, the D/A conversion unit 1311 performs D/A conversion on the DL data signal, and the transmission RF unit 1211 performs transmission RF processing on the DL data signal. After that, the DL data signal is transmitted as a radio signal to the mobile terminal 300 through the antenna 110. Consequently, the transmitting processing of the DL data signal is completed.

Figure 4:
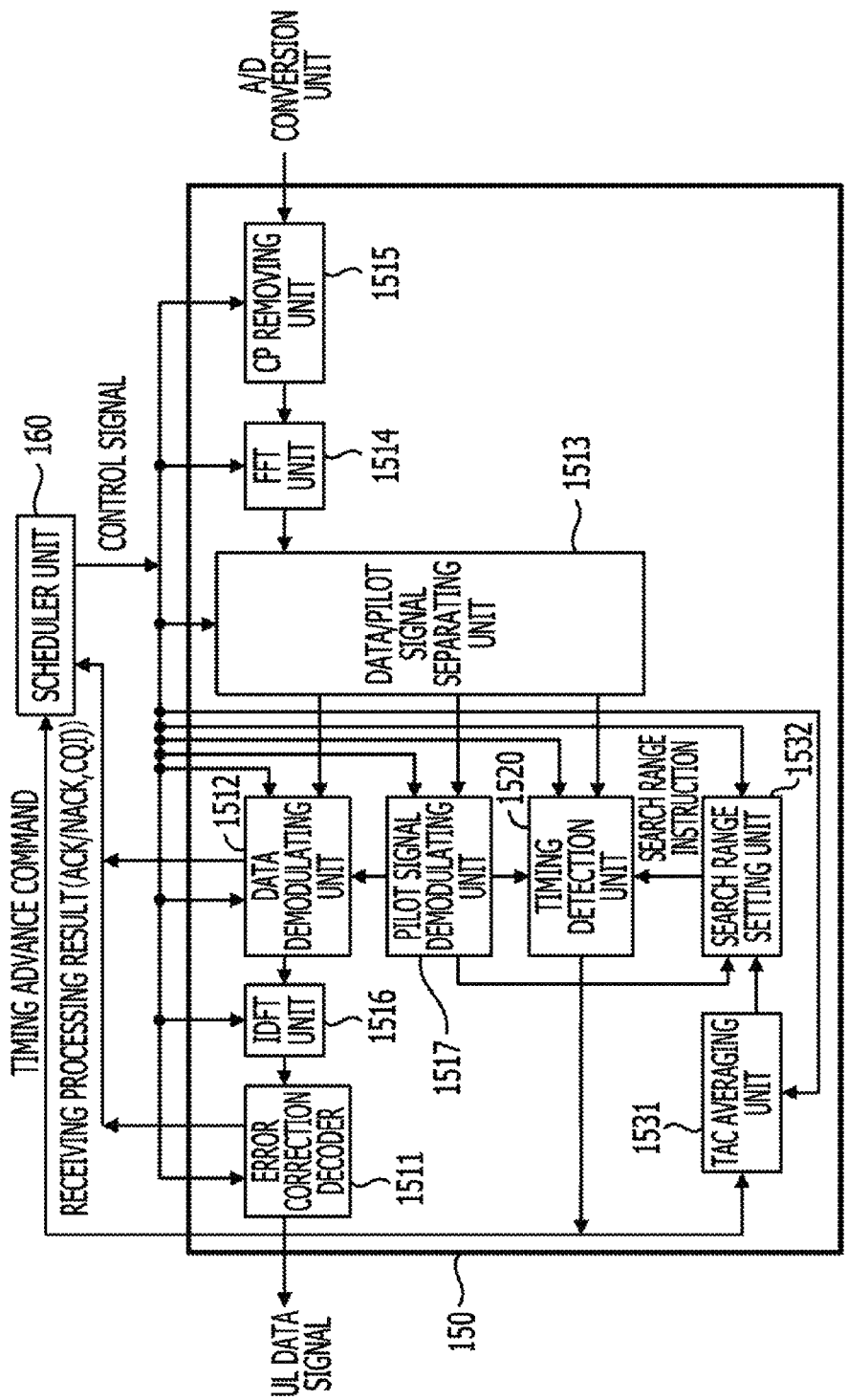
FIG. 4 is a block diagram illustrating an example of a configuration of a receiving processing unit included in the radio base station according to the first embodiment.

With reference to FIG. 4, the receiving processing unit 150 that performs the receiving processing on the UL data signal will be described in detail. FIG. 4 is a block diagram illustrating an example of a configuration of the receiving processing unit 150 included in the radio base station 101 according to the first embodiment.

As illustrated in FIG. 4, the receiving processing unit 150 includes an error correction decoder 1511, an Inverse Discrete Fourier Transform (IDFT) unit 1516, a data demodulating unit 1512, a data/pilot signal separating unit 1513, a Fast Fourier Transform (FFT) unit 1514, a CP removing unit 1515, a pilot signal demodulating unit 1517 that corresponds to an embodiment of the "acquiring unit," a timing detection unit 1520 that corresponds to an embodiment of the "adjusting unit," a Timing Advance Command (TAC) averaging unit 1531 that corresponds to an embodiment of the "calculating unit," and a search range setting unit 1532 that corresponds to an embodiment of the "changing unit." The receiving processing unit 150 illustrated in FIG. 4 may be used as a receiving processing unit 150 that is included in the radio base station 101 in the radio communication system 1 complying with LTE or may be used as a receiving processing unit included in the radio communication system complying with another method.

The receiving processing unit 150 performs the processing described below based on various control signals output from the scheduler unit 160. As described above, the reception RF unit 1221 performs reception RF processing on the UL data signal received through the antenna 110, and the A/D conversion unit 1321 performs A/D conversion processing on the UL data signal received through the antenna 110. After that, the UL data signal is output to the CP removing unit 1515. The CP removing unit 1515 removes the CP in the UL data signal and then outputs the UL data signal whose CP is removed to the FFT unit 1514. The FFT unit 1514 performs FFT processing on the UL data signal from which the CP is removed and then outputs the UL data signal subjected to the FFT processing to the data/pilot signal separating unit 1513. The data/pilot signal separating unit 1513 separates a pilot signal included in the UL data signal. The data/pilot signal separating unit 1513 outputs the UL data signal from which the pilot signal is separated to a data demodulating unit 1512 and then outputs the separated pilot signal to the pilot signal demodulating unit 1517. The pilot signal demodulating unit 1517 performs demodulating processing on the pilot signal and then outputs the pilot signal subjected to the demodulating processing to the data demodulating unit 1512. At this time, the pilot signal demodulating unit 1517 outputs the pilot signal subjected to the demodulating processing to the timing detection unit 1520 and the search range setting unit 1532, respectively. The data demodulating unit 1512 performs the demodulating processing on the UL data signal based on the pilot signal and then outputs the UL data signal subjected to the demodulating processing to the IDFT unit 1516. The IDFT unit 1516 performs IDFT processing on the UL data signal subjected to the demodulating processing and then outputs the UL data signal subjected to the IDFT processing to the error correction decoder 1511. The error correction decoder 1511 performs error correction decoding processing on the UL data signal subjected to the IDFT processing. Consequently, the receiving processing of the UL data signal is completed.

In parallel with the above-described receiving processing of the UL data signal (that is, the demodulating processing and the like), the receiving processing unit 150 performs timing adjusting processing in such a way that the UL data signals transmitted from the plurality of mobile terminals 300 are received by the radio base station 101 at substantially the same timing. In the first embodiment, the timing adjusting processing in which "timing advance command" specified by "3GPP, TS36.213, 4.2.3: Transmission timing adjustments" is described as an example of the timing adjusting processing.

The timing detection unit 1520 generates a timing advance command based on the pilot signal included in the UL data signal transmitted from each of the mobile terminals 300. Specifically, the timing detection unit 1520 detects the transmission timing of the UL data signal in each of the mobile terminals 300 based on the pilot signal included in the UL data signal transmitted from each of the mobile terminals 300. After that, the timing detection unit 1520 generates the timing advance command to fill a difference between the detected transmission timing and an actual processing reference timing. The generated timing advance command is transferred to the transmitting processing unit 140 through the scheduler unit 160. The transmitting processing unit 140 transmits the timing advance command as a part of the DL data signal to the mobile terminal 300. The mobile terminal 300 that receives the timing advance command shifts the transmission timing (for example, advancing or delaying the transmission timing) mainly in a period specified by the timing advance command. Consequently, the timing adjusting processing of the transmission timing of the UL data signal is performed in each of the mobile terminals 300 in such a way that the UL data signals transmitted from the plurality of mobile terminals 300 are received by the radio base station 101 at the same timing. The timing adjusting processing of the transmission timing is performed in each of the mobile terminals 300.

For example, a "Demodulation reference signal" specified by "3GPP, TS36.211, 5.5.2," a "Sounding reference signal" specified by "3GPP, TS36.211, 5.5.3," and the like are given as examples of the pilot signal. The pilot signal may be multiplexed with the UL data signal, which is transmitted from the mobile terminal 300 to the radio base station 101, in an arbitrary cycle that is previously set or is appropriately set. For example, one pilot signal is multiplexed in each of a plurality of frames of a prescribed number that is previously set or is appropriately set from among the plurality of frames included in the UL data signal. That is, the pilot signal is multiplexed in such a way that the pilot signal is discretely located in the data signal to be transmitted from the mobile terminal 300 to the radio base station 101 in the cycle that is previously set or is appropriately set.

Figure 5:
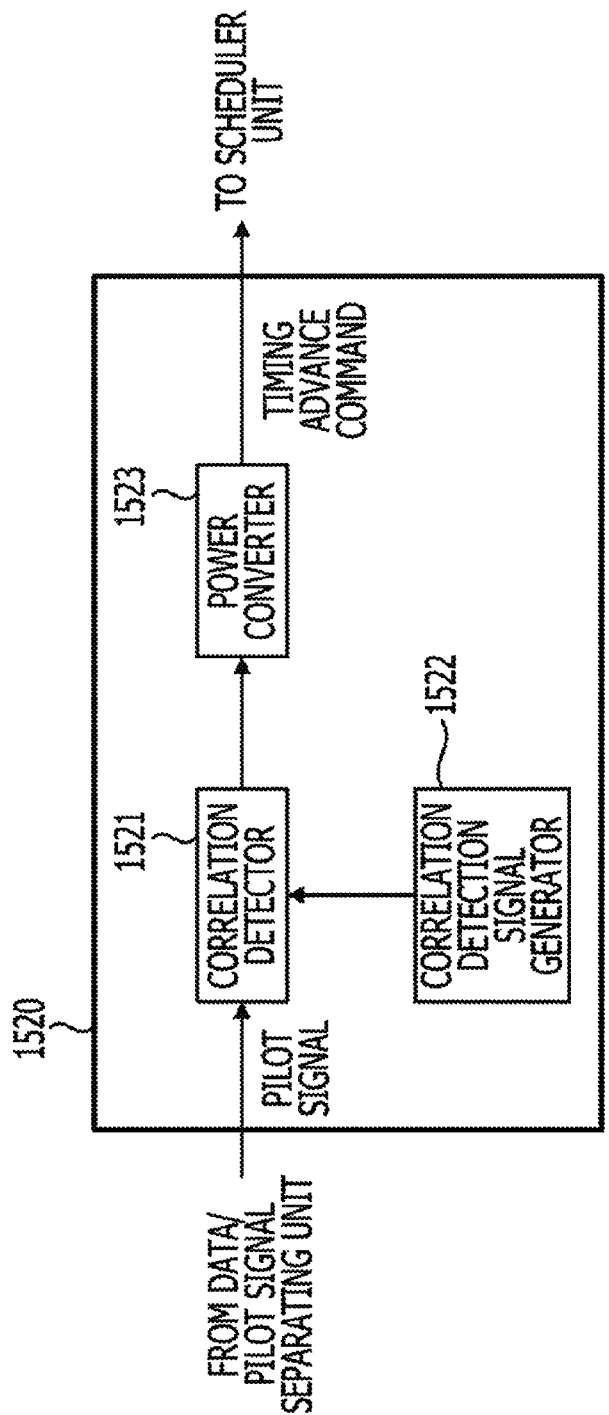
FIG. 5 is a block diagram illustrating an example of a configuration of a timing detection unit.
Figure 6:
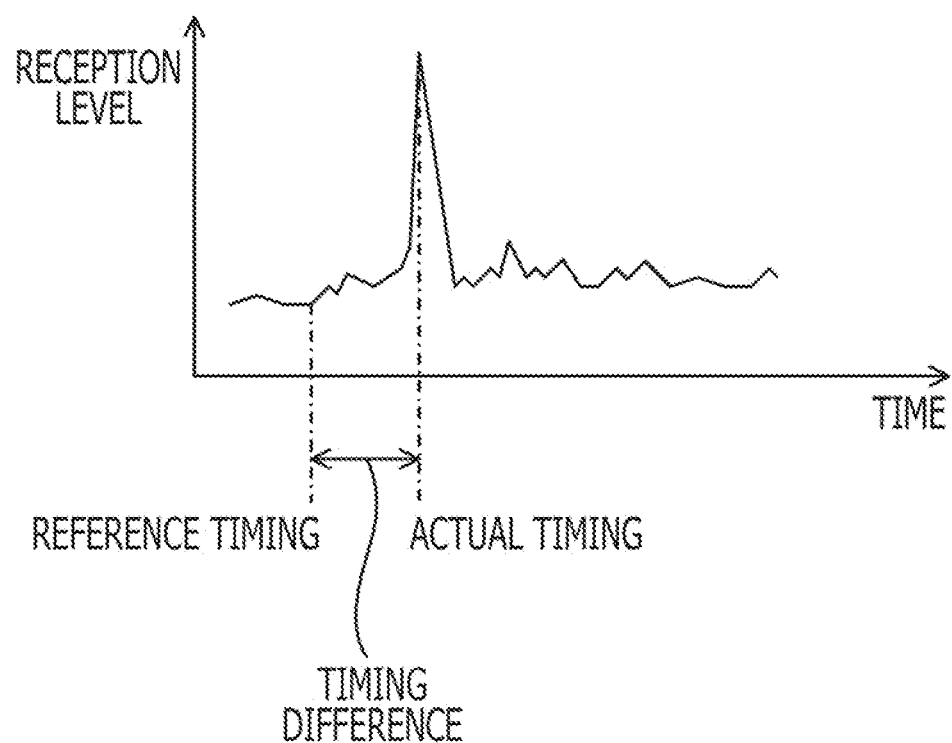
FIG. 6 is a graph illustrating an example of a difference (a delay profile) of a timing generated by the timing detection unit.

With reference to FIG. 5 and FIG. 6, the configuration and the processing of the timing detection unit 1520 are described in detail. FIG. 5 is a block diagram illustrating an example of a configuration of the timing detection unit 1520. FIG. 6 is a graph illustrating an example of a difference (delay profile information) of the timings generated by the timing detection unit 1520.

As illustrated in FIG. 5, the timing detection unit 1520 includes a correlation detector 1521, a correlation detection signal generator 1522, and a power converter 1523. The correlation detector 1521 such as a Matched Filter (MF) or the like detects a correlation between the pilot signal output from the pilot signal demodulating unit 1517 and a correlation detection signal (for example, the signal equivalent to the pilot signal in actual use) output from the correlation detection signal generator 1522. The correlation detector 1521 outputs the acquired correlation value to the power converter 1523. The power converter 1523 performs power conversion by squaring the correlation value output from the correlation detector 1521. As a result, for example, the delay profile information (for example, a correlation graph with a reception level for a vertical axis and a time for a transverse axis) illustrated in FIG. 6 is acquired. The timing detection unit 1520 searches a reception timing of the UL data signal transmitted from the mobile terminal 300 based on the delay profile information. The timing detection unit 1520 measures a difference (a timing difference) between the desired timing (that is, the processing reference timing in the radio base station 101) and an actual reception timing. For example, the timing detection unit 1520 measures the difference between the desired timing and the actual reception timing (for example, the timing at which the highest reception level may be acquired). After that, the timing detection unit 1520 generates the timing advance command based on the measured difference.

According to the first embodiment, a search period (for example, a period in which the delay profile information is generated based on the pilot signal, a period in which the timing advance command is generated based on the delay profile information, or a period acquired by summing up the periods) in which the timing detection unit 1520 performs processing may be variably set by processing of the search range setting unit 1532. Based on the pilot signal and the control signal from the TAC averaging unit 1531, the search range setting unit 1532 sets the search period in which the timing detection unit 1520 performs processing. Since the processing by the TAC averaging unit 1531 and the search range setting unit 1532 will be described below, the detailed description is omitted (see (1-4) processing description below, and FIGS. 8 and 9).

(1-3) Mobile Terminal

Figure 7:
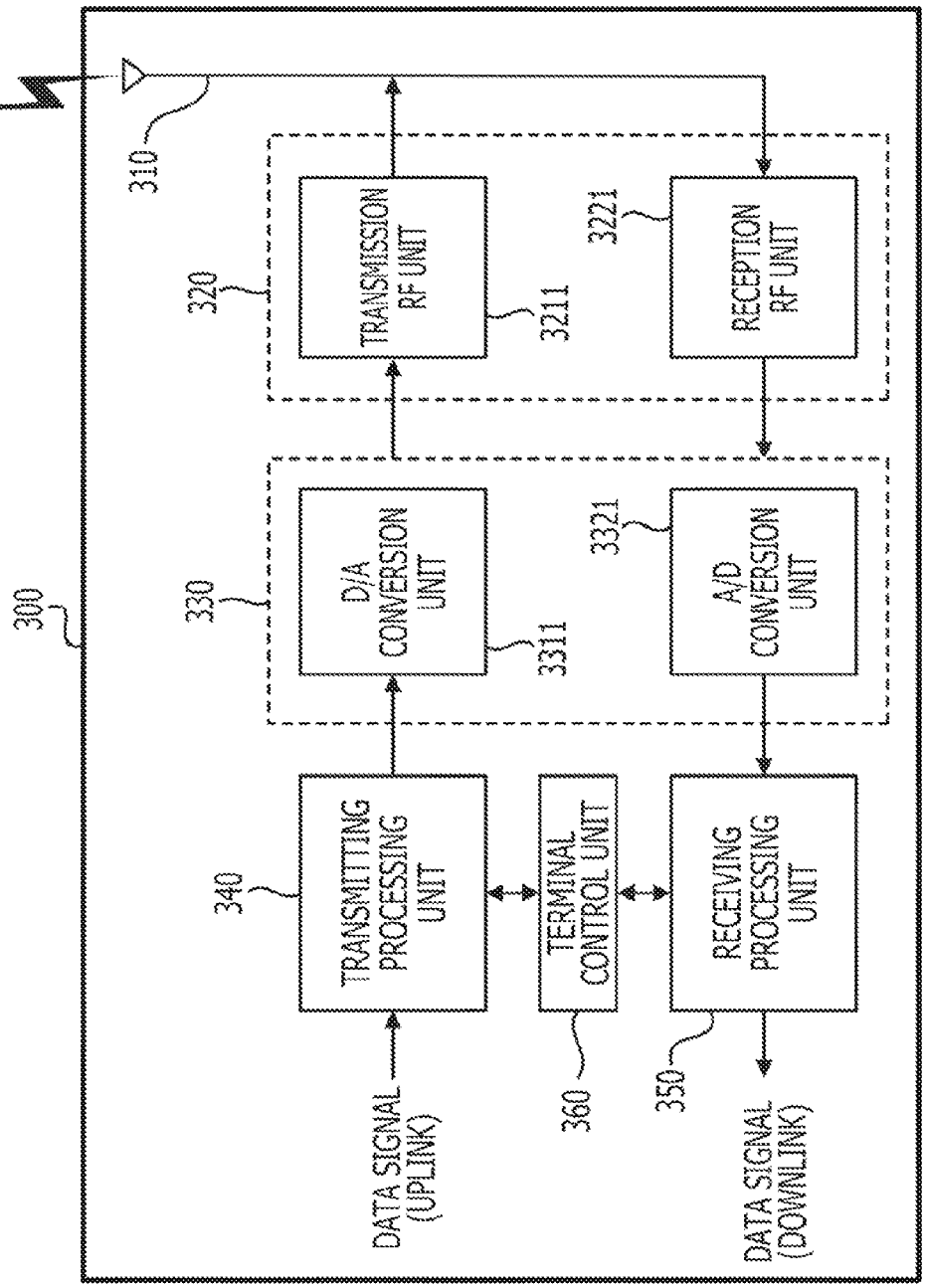
FIG. 7 is a block diagram illustrating an example of a configuration of a mobile terminal included in the radio communication system according to the first embodiment.

With reference to FIG. 7, an example of the configuration of the mobile terminal 300 in the radio communication system according to the first embodiment will be described below. FIG. 7 is a diagram illustrating an example of the configuration of the mobile terminal 300 in the radio communication system according to the first embodiment.

As illustrated in FIG. 7, the mobile terminal 300 includes an antenna 310, an RF processing unit 320 having a transmission RF unit 3211 and a reception RF unit 3221, a converting processing unit 330 having a D/A conversion unit 3311 and an A/D conversion unit 3321, a transmitting processing unit 340, a receiving processing unit 350, and a terminal control unit 360.

To receive the DL data signal transmitted from the radio base station 101, the reception RF unit 3221 performs the radio receiving processing on the DL data signal received through the antenna 310 and then outputs the DL data signal subjected to the radio receiving processing to the A/D conversion unit 3321. The A/D conversion unit 3321 converts the DL data signal as an analog signal into a digital signal and then outputs the DL data signal converted into the digital signal to the receiving processing unit 350. The receiving processing unit 350 performs the demodulating processing on the DL data signal based on the control signal output from the terminal control unit 360. Accordingly, the receiving processing of the DL data signal transmitted from the radio base station 101 is performed.

To transmit the UL data signal to be transmitted to the radio base station 101, the transmitting processing unit 340 performs the modulating processing or the like on the UL data signal to be transmitted to the radio base station 101 based on the control signal output from the terminal control unit 360. The transmitting processing unit 340 outputs the UL data signal subjected to the modulating processing to the D/A conversion unit 3311. The D/A conversion unit 3311 converts the UL data signal as a digital signal into an analog signal and then outputs the UL data signal converted into the analog signal to the transmission RF unit 3211. The transmission RF unit 3211 performs the radio transmitting processing on the UL data signal that is converted into the analog signal. Therefore, the digital signal of a baseband frequency band output from the transmitting processing unit 340 is converted into an analog signal of a radio frequency band. After that, the UL data signal subjected to the radio transmitting processing is transmitted to the radio base station 101. Accordingly, the transmitting processing of the UL data signal to be transmitted to the radio base station 101 is performed.

The receiving processing unit 350 extracts the timing advance command from the DL data signal subjected to the demodulating processing and then outputs the extracted timing advance command to the terminal control unit 360. The terminal control unit 360 controls the transmission timing with respect to the transmitting processing unit 340 according to the timing advance command. The modulating processing by the transmitting processing unit 340, the D/A converting processing by the D/A conversion unit 3311, and the radio transmitting processing by the transmission RF unit 3211 are performed so that the processing corresponds to the transmission timing instructed by the terminal control unit 360. Accordingly, the UL data signal is transmitted from the mobile terminal 300 at timing according to the timing advance command.

(1-4) Processing Description

Figure 8:
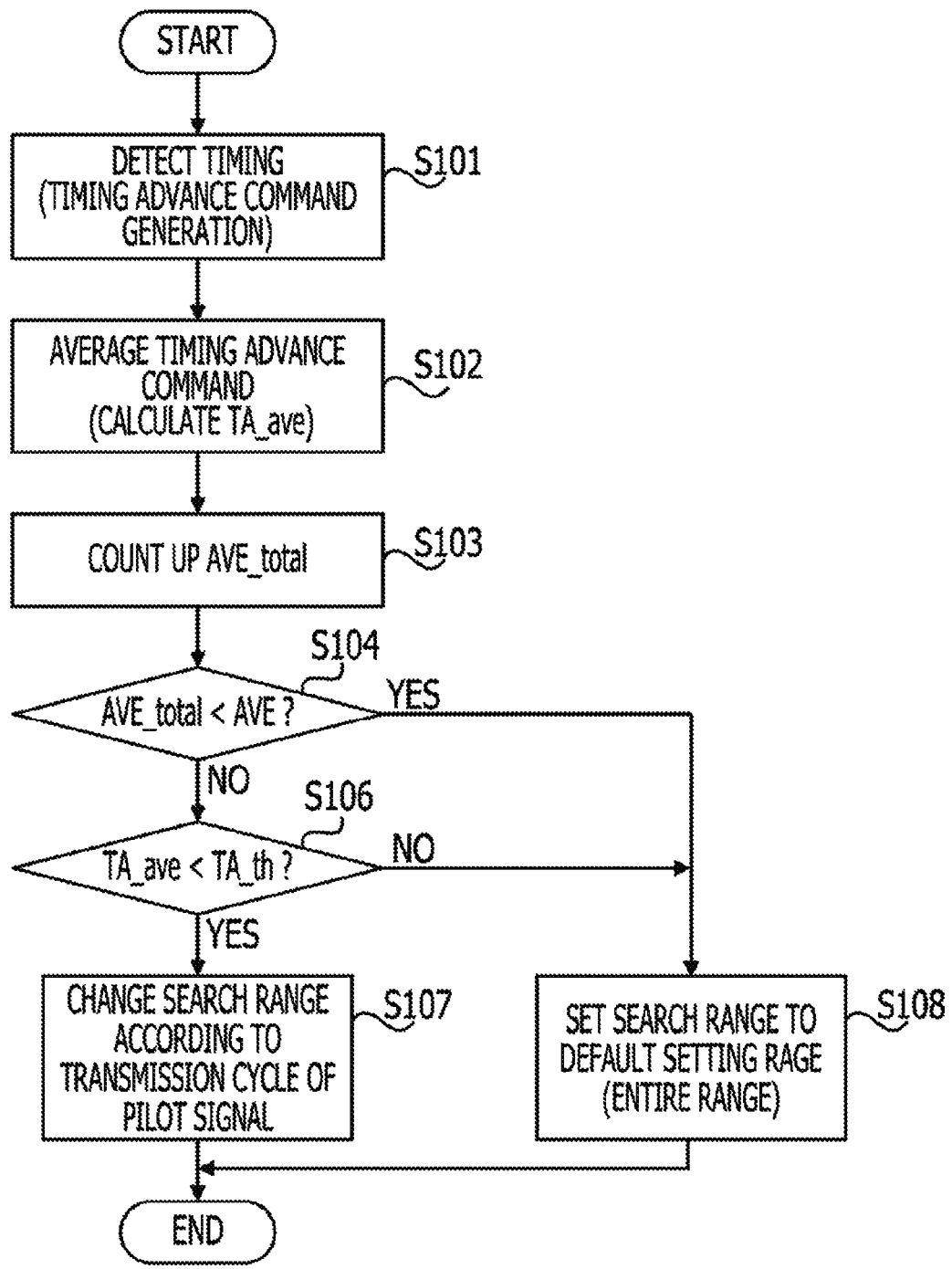
FIG. 8 is a flowchart illustrating an example of a flow of processing (specifically, processing of a TAC average unit and a search range setting unit) of the radio base station according to the first embodiment.
Figure 9:
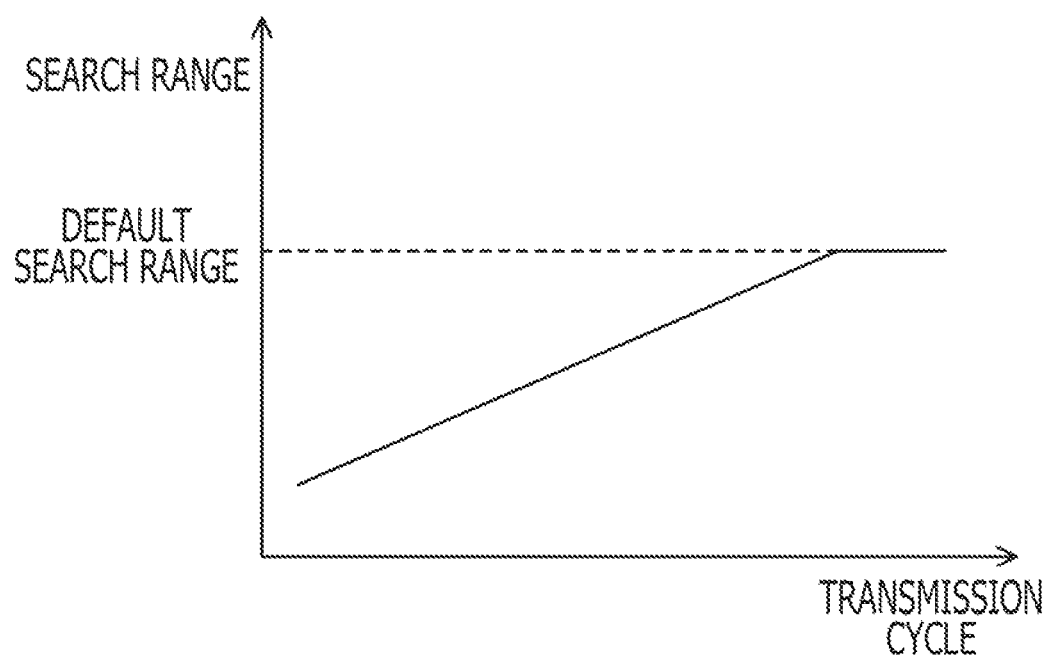
FIG. 9 is a graph illustrating an example of search range specification information that is referred to by the radio base station (specifically, the search range setting unit) according to the first embodiment.

With reference to FIG. 8 and FIG. 9, a flow of the processing (specifically, the processing of the TAC averaging unit 1531 and the search range setting unit 1532) of the radio base station 101 according to the first embodiment will be described. FIG. 8 is a flowchart illustrating an example of the flow of the processing of the radio base station 101 according to the first embodiment (specifically, the processing of the TAC averaging unit 1531 and the search range setting unit 1532). FIG. 9 is a graph illustrating an example of search range specification information referred to by the radio base station 101 (specifically, the search range setting unit 1532) according to the first embodiment.

As illustrated in FIG. 8, the timing detection unit 1520 generates the timing advance command based on the pilot signal included in the UL data signal transmitted from each of the mobile terminals 300 (Operation S101). The timing detection unit 1520 outputs the generated timing advance command to the scheduler unit 160 and the TAC averaging unit 1531, respectively.

The TAC averaging unit 1531 calculates an average value TA_ave of the timing advance command (Operation S102). The TAC averaging unit 1531 may calculate the average value TA_ave every time the timing advance command is output from the timing detection unit 1520, may calculate the average value TA_ave in each prescribed period, or may calculate the average value TA_ave in another manner. For example, if the timing advance commands sequentially transmitted from the timing detection unit 1520 are "TAC#1," "TAC#2," etc., and "TAC#n (n is an integer of one or more)," the TAV averaging unit 1531 calculates "TAC#1+TAC#2+ . . . + TAC#n)/n" as the average value TA_ave of the timing advance command. Specifically, for example, if the timing advance commands sequentially transmitted from the timing detection unit 1520 are "1," "−2," and "3," the TAV averaging unit 1531 calculates "(1+(−2)+3)/3≈0.67" as the average value TA_ave of the timing advance command.

In Operation S102, the TAC averaging unit 1531 may calculate the average value TA_ave of an absolute value of the timing advance command. For example, if the timing advance commands sequentially transmitted from the timing detection unit 1520 are "TAC#1," "TAC#2," etc., and "TAC#n," the TAC averaging unit 1531 may calculate "(|TAC#1|+ |TAC#2|+ . . . +|TAC#n|)/n" as the average value TA_ave of the absolute value of the timing advance command. Specifically, for example, if the timing advance commands sequentially transmitted from the timing detection unit 1520 are "1," "−2," and "3," the TAC averaging unit 1531 may calculate "(1+2+3)/3=2" as the average value TA_ave of the absolute value of the timing advance command.

Furthermore, in Operation S102, the TAC averaging unit 1531 may calculate a moving average value TA_ave in a prescribed period of the timing advance command. In other words, the TAC averaging unit 1531 may calculate the moving average value TA_ave of the timing advance command of a prescribed number of AVEs that were output in the past. If the timing advance commands sequentially transmitted from the timing detection unit 1520 are "TAC#1," "TAC#2," etc., and "TAC#n" and the prescribed number of AVEs for calculation of the moving average value (that is, the moving averaging number of times) is "m(m<n)," the TAC averaging unit 1531 may calculate "(TAC#n-m-1+TAC#n-m-2+ . . . + TAC#n)/m" as the moving average value TA_ave of the timing advance command.

The TAC averaging unit 1531 counts a number of times AVE_total that calculates the average value TA_ave (Operation S103). The number of times AVE_total that is counted up in Operation S103 is a total number of the number of times after the radio base station 101 starts the communication. The TAC averaging unit 1531 determines whether or not the number of times AVE_total by which the average value TA_ave is calculated after the radio base station 101 starts the communication is less than the moving averaging number of times AVE by which the moving average value TA_ave is calculated in Operation S102 (Operation S104). The TAC averaging unit 1531 outputs a determination result obtained in Operation S104 to the search range setting unit 1532.

If the moving average value TA_ave is not calculated in Operation S102 (in other words, a regular average value TA_ave is calculated), the processing in Operations S103 and S104 may not typically be performed. In this case, the processing in Operations S103 and S104 is not performed, and the processing in Operation S106 may be performed.

Based on the determination in Operation S104, if the number of times AVE_total by which the average value TA_ave is calculated is less than the moving averaging number of times AVE (Yes in Operation S104), the search range setting unit 1532 sets a default setting range (for example, the entire default setting range) as the search range (Operation S108). As a result, the timing detection unit 1520 generates delay profile information based on the pilot signal during a period specified by the default setting range or generates the timing advance command based on the delay profile information.

Based on the determination in Operation S104, if the number of times AVE_total by which the average value TA_ave is calculated is not less than the moving averaging number of times AVE (No in Operation S104), the TAC averaging unit 1531 determines whether or not the average value TA_ave calculated in Operation S102 is less than a prescribed threshold value TA_th (Operation S106).

Based on the determination in Operation S106, if the average value TA_ave is not less than the prescribed threshold value TA_th (No in Operation S106), the search range setting unit 1532 sets the default setting range as the search range (Operation S108). As a result, the timing detection unit 1520 generates the delay profile information based on the pilot signal during the period specified by the default setting range or generates the timing advance command based on the delay profile information.

Based on the determination in Operation S106, if the average value TA_ave is less than the prescribed threshold TA_th (Yes in Operation S106), the search range setting unit 1532 sets the search range according to the transmission cycle of the pilot signal (that is, the pilot signal that is referred to when the timing advance command is calculated) (Operation S107). As a result, the timing detection unit 1520 generates the delay profile information based on the pilot signal during the period specified by the search range that is different from the default setting range or generates the timing advance command based on the delay profile information.

For example, the search range setting unit 1532 may sets the search range in such a way that the set search range is shorter (smaller) than the default setting range. Moreover, for example, the search range setting unit 1532 sets the search range in such a way that the search range is longer (larger) as the transmission cycle of the pilot signal is longer while the search range is shorter (smaller) as the transmission cycle of the pilot signal is shorter. Alternatively, the search range setting unit 1532 may set the search range variable in an arbitrary manner or an appropriate manner according to the transmission cycle of the pilot signal based on a relation between the transmission cycle of the pilot signal and the processing by the timing detection unit 1520.

The search range setting in Operation S107 may be performed based on the search range specification information that is previously specified inside the radio base station 101. As illustrated in FIG. 9, for example, the search range setting unit 1532 may set the search range based on the search range specification information (a search range specification graph) that specifies a correlation relation in which the search range is longer as the transmission cycle of the pilot signal is longer while the search range is short as the transmission cycle of the pilot signal is shorter (in this case, the upper limit of the search range is the default setting range.). As far as the search range may be suitably set, the specific manner of the search range specification information is not limited. A prescribed formula (a function or a graph) with a variable number as the transmission cycle of the pilot signal, a prescribed table (a list or a database) that includes the transmission cycle of the pilot signal as one item, and the like are given as examples of the search range specification information.

The above-described processing is performed in each of the mobile terminals 300. For example, if the radio base station 101 performs communication with both the mobile terminal 300a and the mobile terminal 300b, the processing from Operation S101 to Operation S108 performed on the mobile terminal 300a and the processing from Operation S101 to Operation S108 performed on the mobile terminal 300b may be performed separately or in parallel with each other.

The radio base station 101 according to the first embodiment may set the search range variably. For example, the radio base station 101 according to the first embodiment may set the search range so that the search range is shorter than the default setting range. Therefore, compared to a radio base station that uses the default setting range (that is, the largest search range) most of the time if not always, the processing load (for example, processing load related to generation of the delay profile information based on the pilot signal or processing load related to generation of the timing advance command based on the delay profile information) of the radio base station 101 may be decreased. This makes it possible to reduce the scale of a hardware configuration and consumption power of the radio base station 101.

The radio base station 101 according to the first embodiment may set the search range based on the transmission cycle of the pilot signal. If the transmission cycle of the pilot signal is relatively long, a distance, in which the mobile terminal 300 moves until a next pilot signal is transmitted after the pilot signal is transmitted, is considered to be long. Therefore, a communication quality between mobile terminal 300 and the radio base station 101 may considerably vary. The radio base station 101 according to the first embodiment may make the search period longer (that is, the delay profile information or the timing advance command is generated for a long time or generated at a high frequency) as the transmission cycle of the pilot signal is longer. Therefore, under a situation where the communication quality between the mobile terminal 300 and the radio base station 101 may considerably vary, the radio base station 101 may appropriately adjust the transmission timing according to the communication quality that may vary from moment to moment.

If the transmission cycle of the pilot signal is relatively short, the distance, in which the mobile terminal 300 moves until the next pilot signal is transmitted after the pilot signal is transmitted, is considered to be short. Accordingly, there is a relatively low possibility that the communication quality between the mobile terminal 300 and the radio base station 101 considerably varies. If the transmission cycle of the pilot signal is shorter, the radio base station 101 according to the first embodiment may shorten the search period (that is, the delay profile information or the timing advance command may be generated in a short time or generated at a low frequency). Therefore, under the situation where there is the relatively low possibility that the communication quality between the mobile terminal 300 and the radio base station 101 considerably varies, the radio base station 101 may decrease the processing load by decreasing an adjustment frequency of the transmission timing. As a result, the radio base station 101 according to the first embodiment may set the search range based on the transmission cycle of the pilot signal.

If the adjustment amount of the transmission timing in the mobile terminal 300 is relatively small (that is, if the average value TA_ave is less than the threshold value TA_th), it is assumed that the communication quality between the mobile terminal 300 and the radio base station 101 is relatively stable. Accordingly, the adjustment of the transmission timing may not typically be performed at a high frequency or performed for a long time. The radio base station 101 according to the first embodiment may set the search range in such a way that the search range is shorter than the default setting range if the adjustment amount of the transmission timing in the mobile terminal 300 is relatively small. If the adjustment amount of the transmission timing in the mobile terminal 300 is relatively large (that is, if the average value TA_ave is equal to or larger than the prescribed threshold value TA_th), it is assumed that the communication quality between the mobile terminal 300 and the radio base station 101 is unstable. Accordingly, the adjustment of the transmission timing may be performed at the high frequency or performed for a long time. The radio base station 101 according to the first embodiment may maintain the search range as the default setting range. The radio base station 101 according to the first embodiment may set the search range variably in consideration of the stability of the communication quality. As a result, the radio base station 101 according to the first embodiment may achieve the above-described various effects without reducing the stability of the communication quality.

For the above-described threshold value TA_th, the value that may maintain the appropriate communication quality may be set while the stability of the communication quality and the adjustment amount of the transmission timing are taking into consideration. Moreover, the threshold value TA_th may be set in each of the mobile terminals 300.

The radio base station 101 according to the first embodiment may use the average value of the absolute value of the timing advance command as the average value TA_th. Therefore, the radio base station 101 according to the first embodiment may appropriately recognize whether or not the communication quality is stable according to the average value TA_th even if the timing advance command considerably varies between a positive value and a negative value. Consequently, as described above, the radio base station 101 according to the first embodiment may achieve the above-described various effects without further reducing the stability of the communication quality.

The radio base station 101 according to the first embodiment may use the moving average value of the timing advance command as the average value TA_th. Therefore, the average value TA_th may be calculated by appropriately considering the nearest communication quality or the current communication quality without being affected by a large deterioration (for example, a momentary quality deterioration) of the timing advance command during a part of the past period. Consequently, as described above, the radio base station 101 according to the first embodiment may achieve the above-described various effects without further reducing the stability of the communication quality.

The radio base station 101 according to the first embodiment may maintain the search range as the default setting range if the number of times AVE_total by which the average value TA_ave is calculated is less than the moving averaging number of times AVE. Accordingly, the search range is not set based on the average value TA_ave, which may have a low accuracy because the number of times of calculating the average value is small. Consequently, the above-described various effects may be achieved without further reducing the stability of the communication quality.

The above description has been made of the radio communication system complying with the LTE (or Wimax) method. However, the above-described method is an example. The above-described radio base station 101 is applicable to a radio communication system complying with another method (or specification).

In the radio communication system complying with the LTE method and the like, the specification specifies that the above-described pilot signal is not typically inserted into all of the plurality of frames included in the UL data signal. Specifically, the specification specifies that the above-described pilot signal may be inserted into an arbitrary frame out of the plurality of frames included in the UL data signal. On the other hand, in the radio communication system complying with the CDMA method, the specification specifies that the above-described pilot signal is inserted into all of the plurality of frames included in the UL data signal. Therefore, the specification adds that the above-described processing according to the first embodiment is considerably different from a known search range setting (for example, the path search period setting) that is performed in the radio communication system complying with the CDMA method.

(1-5) Deformation Processing Example

A deformation processing example of the radio base station 101 according to the first embodiment will be described. In the above-description, the radio base station 101 sets the search range based on the transmission cycle of the pilot signal. In a deformation processing example, the search range is set based on the transmission cycle of the pilot signal and the actual adjustment mount of the transmission timing (that is, the timing advance command).

Specifically, in the deformation processing example, if the radio base station 101 sets the search range variably (that is, if the processing in Operation S107 illustrated in FIG. 8 is performed), the radio base station 101 sets the search range in such a way that the search range is (Average value TA_ave of timing advance command×Adjustment amount TA_step of one step of timing advance command×Prescribed coefficient k)+(Moving speed v of Mobile terminal 300×Transmission cycle T/Optical speed c of Pilot signal). That is, in the deformation processing example, the radio base station 101 sets the search range in such a way that the search range is shorter as the transmission cycle of the pilot signal is shorter and that the search range is shorter as the actual adjustment amount of the transmission timing is smaller.

In the deformation processing example, the radio base station 101 acquires information related to a moving speed v of the mobile terminal 300. For example, the radio base station 101 may estimate the moving speed v of the mobile terminal 300 based on a fading frequency. Specifically, the radio base station 101 may estimate the moving speed v of the mobile terminal 300 based on a formula "Moving speed v of Mobile terminal 300=Wavelength of Carrier wave×Fading frequency."

Also in the deformation processing example, the search range may be set based on the transmission cycle of the pilot signal. Therefore, the effects equivalent to the above-described various effects may be appropriately achieved. In the deformation processing example, the search range may be set based on an actual adjustment amount of the transmission timing. If the actual adjustment amount of the transmission timing is relatively large, it is assumed that the communication quality between the mobile terminal 300 and the radio base station 101 is unstable. Accordingly, the transmission timing may be adjusted at a high frequency or may be adjusted for a long time. In the deformation processing example, the search period may be longer (that is, the generation of the delay profile information or the generation of the timing advance command is performed for a long time or performed at the high frequency) as the actual adjustment amount of the transmission timing is larger. If the actual adjustment amount of the transmission timing is relatively small, the communication quality between the mobile terminal 300 and the radio base station 101 is assumed to be stable. Consequently, the transmission timing may not typically be adjusted at the high frequency or adjusted for a long time. In the deformation processing example, the search period may be shortened (that is, the generation of the delay profile information or the generation of the timing advance command is performed for a short time or performed at a low frequency) as the actual adjustment amount of the transmission timing is smaller. Therefore, in the deformation processing example, the search range may be appropriately set based on the actual adjustment amount of the transmission timing.

The above-described formula is an example, and the setting processing of the search range in the deformation example is not limited to the above-described formula. In this case, for example, the search range is set in such a way that the search range is shorter as the transmission cycle of the pilot signal is shorter. That is, the search range is set so that the transmission cycle of the pilot signal is proportional to the search range. Similarly, the search range is set in such a way that the search range is shorter as the actual adjustment of the transmission timing is smaller. That is, the search range is set so that the actual adjustment range is proportional to the search range.

(2) Second Embodiment

Figure 10:
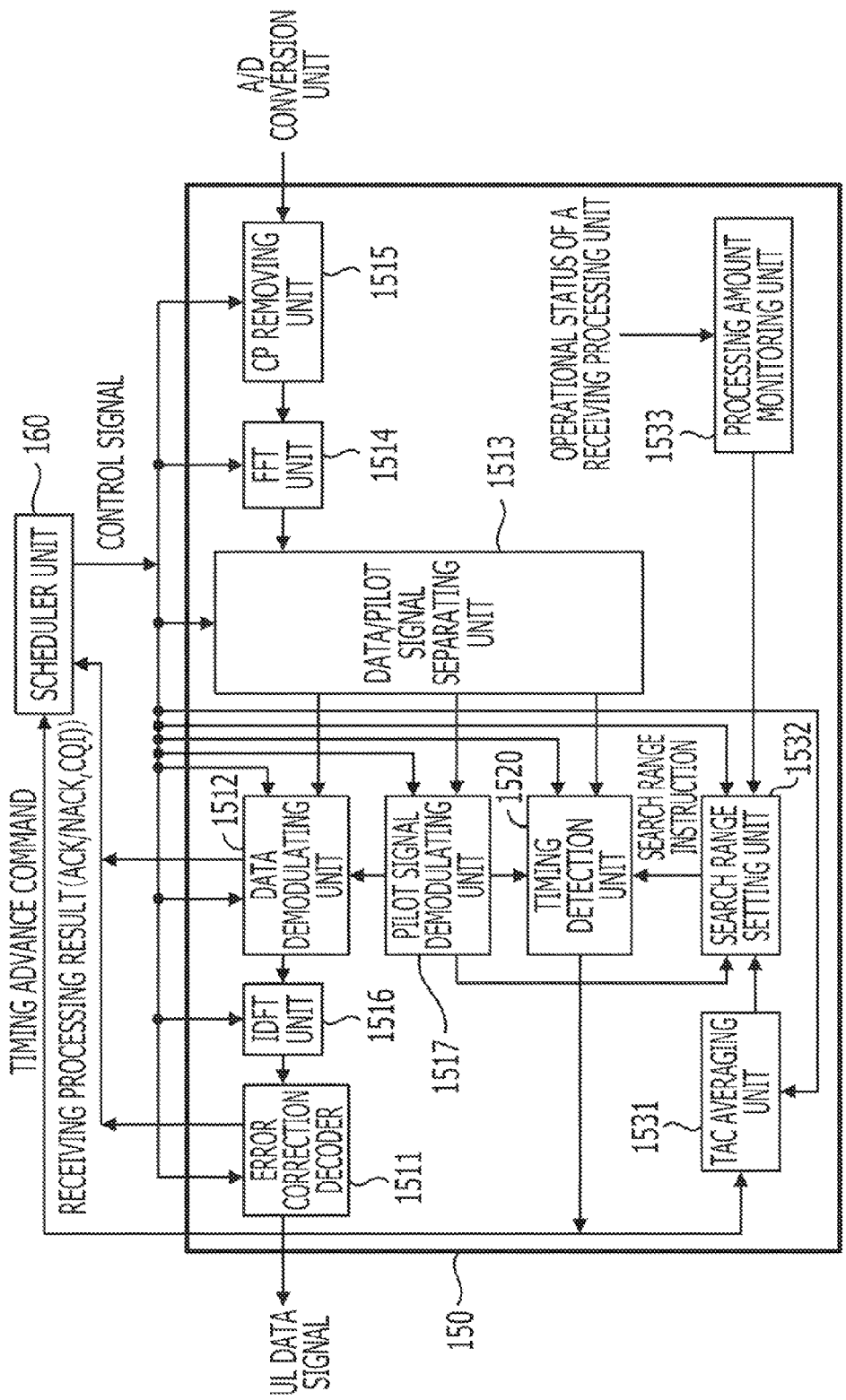
FIG. 10 is a block diagram illustrating an example of a configuration of a receiving processing unit included in a radio base station according to a second embodiment.

With reference to FIG. 10 and FIG. 11, a radio communication system 2 according to a second embodiment will be described. The configuration and part of the processing of the radio base station 102 of the radio communication system 2 according to the second embodiment are different from the configuration and the part of the processing of the radio base station 102 of the radio communication system 1 according to the first embodiment (specifically, the configuration and the processing of the receiving processing unit 151 included in the radio base station 102). The differences (that is, the radio base station 102) between the radio communication system 2 according to the second embodiment and the radio communication system 1 according to the first embodiment will be mainly described below. The configuration and the processing equivalent to the radio communication system 1 according to the first embodiment are indicated with the same reference numerals and operation numbers, so that the detailed description is omitted.

The configuration of the radio communication system 2 and the configuration of the mobile terminal 300 according to the second embodiment may be equivalent to or different from the configuration of the radio communication system 1 and the configuration of the mobile terminal 300 according to the first embodiment (2-1) Radio Base Station With reference to FIG. 10, the radio base station 102 included in the radio communication system 2 according to the second embodiment will be described. A description will be made below of an example in which the configuration other than the receiving processing unit 151 in the radio base station 102 according to the second embodiment (that is, the RF processing unit 120, the converting processing unit 130, the transmitting processing unit 140, and the scheduler unit 160) is equivalent to the radio base station 101 according to the first embodiment. Accordingly, the receiving processing unit 151 in the radio base station 102 according to the second embodiment will be described for description simplification. FIG. 10 is a block diagram illustrating an example of a configuration of a receiving processing unit 151 in the radio base station 102 according to the second embodiment.

As illustrated in FIG. 10, as with the receiving processing unit 150 according to the radio base station 101 according to the first embodiment, the receiving processing unit 151 in the radio base station 102 according to the second embodiment includes the error correction decoder 1511, the IDFT unit 1516, the data demodulating unit 1512, the data/pilot signal separating unit 1513, the FFT unit 1514, the CP removing unit 1515, the pilot signal demodulating unit 1517, the timing detection unit 1520, the TAC averaging unit 1531, and the search range setting unit 1532.

The receiving processing unit 151 in the radio base station 102 according to the second embodiment further includes a processing amount monitoring unit 1533 that corresponds to an embodiment of the "detection unit." The processing amount monitoring unit 1533 collects operational statuses of components of the radio base station 102 and calculates a processing amount P of the radio base station 102 based on the operational status. Alternatively, the processing amount monitoring unit 1533 collects the operational statuses of the components inside the receiving processing unit 151 from among the components of the radio base station 102 and calculates the processing amount P of the receiving processing unit 151 based on the operational status. An arbitrary parameter may be employed as the processing amount P. A load rate, an operation rate, or the like of the radio base station 102 (or the receiving processing unit 151) is given as an example of the processing amount P.

(2-2) Processing Description

With reference to FIG. 11, a flow of the processing of the radio base station 102 according to the second embodiment (specifically, the processing of the processing amount monitoring unit 1533, the TAC averaging unit 1531, and the search range setting unit 1532) will be described. FIG. 11 is a flowchart illustrating an example of the flow of the processing of the radio base station 102 according to the second embodiment (specifically, the processing of the processing amount monitoring unit 1533, the TAC averaging unit 1531, and the search range setting unit 1532).

As illustrated in FIG. 11, the timing detection unit 1520 generates the timing advance command based on the pilot signal included in the UL data signal transmitted from each of the mobile terminals 300 (Operation S101). The TAC averaging unit 1531 calculates the average value TA_ave of the timing advance command (Operation S102). The TAC averaging unit 1531 counts up the number of times AVE_total by which the average value TA_ave is calculated (Operation S103).

The processing amount monitoring unit 1533 determines whether or not the calculated processing amount P is less than a prescribed threshold value P_th (Operation S111).

Based on the determination in Operation S111, if the processing amount P is less than the prescribed threshold value P_th (Yes in Operation S111), the search range setting unit 1532 sets the default setting range as the search range (Operation S108).

Based on the determination in Operation S111, if the processing amount P is not less than the prescribed threshold value P_th (No in Operation S111), the TAC averaging unit 1531 determines whether or not the total number of times AVE_total by which the average value TA_ave is calculated after the radio base station starts the communication is less than the moving averaging number of times AVE by which the moving average value TA_ave is calculated in Operation S102 (Operation S104).

Based on the determination in Operation S104, if the number of times AVE_total by which the average value TA_ave is calculated is less than the moving averaging number of times AVE (Yes in Operation S104), the search range setting unit 1532 sets the default setting range as the search range (Operation S108).

Based on the determination in Operation S104, if the number of times AVE_total by which the average value TA_ave is calculated is not less than the moving averaging number of times AVE (No in Operation S104), the TAC averaging unit 1531 determines whether or not the average value TA_ave calculated in Operation S102 is less than the prescribed threshold TA_th (Operation S106).

Based on the determination in Operation S106, if the average value TA_ave is not less than the prescribed threshold value TA_th (No in Operation S106), the search range setting unit 1532 sets the default setting range (for example, the entire default setting range) as the search range (Operation S108).

Based on the determination in Operation S106, if the average value TA_ave is less than the prescribed threshold value TA_th (Yes in Operation S106), the search range setting unit 1532 sets the search range according to the transmission cycle of the pilot signal (that is, the pilot signal that is referred to when the timing advance command is calculated) (Operation S107).

The radio base station 102 according to the second embodiment may achieve the effects equivalent to the above-described various effects that are achieved by the radio base station 101 according to the first embodiment.

The radio base station 102 according to the second embodiment may determine whether the search range is set variably or is set to the default setting range according to the processing amount P of the radio base station 102 (or the receiving processing unit 151). Specifically, the radio base station 102 according to the second embodiment may set the search range to the default setting range if the processing amount P of the radio base station 102 (or the receiving processing unit 151) is relatively small. That is, the radio base station 102 may set the search range to the default setting range (in other words, the search range is set to be relatively long) if there is a margin in the processing ability because the processing amount P of the radio base station is relatively small. Even if the search range is set to the default setting range, the radio base station 102 (or the receiving processing unit 151) may appropriately generate the delay profile information or the timing advance command because there is the margin in the processing ability. Therefore, further stability of the communication quality may be appropriately achieved. On the other hand, the radio base station 102 according to the second embodiment may set the search range variably if the processing amount P of the radio base station 102 (or the receiving processing unit 151) is relatively high. That is, the radio base station 102 may set the search range variably (in other words, the search range is set to be relatively short) if there is no margin in the processing because the processing amount P of the radio base station 102 (or the receiving processing unit 151) is relatively high. Accordingly, the processing load desired for generation of the delay profile information and generation of the timing advance command may be decreased. As a result, the instability of the processing, which is caused because there is no margin in the processing ability of the radio base station 102 (or the receiving processing unit 151), may be reduced.

For the above-described threshold value P-th, the value that may maintain an appropriate communication quality (or processing quality) while the stability of the processing of the radio base station 102 may be taken into consideration. The threshold value P_th is commonly set the radio base station 102. That is, even if the radio base station 102 communicates with a plurality of mobile terminals 300, it is preferable that the threshold value P_th is commonly set to the plurality of mobile terminals 300.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A radio base station comprising:
    an acquiring unit which acquires a pilot signal that is discretely included in a transmission signal to be transmitted from a mobile terminal and is referenced to adjust a transmission timing of the transmission signal in the mobile terminal;
    an adjusting unit which adjusts the transmission timing of the transmission signal in the mobile terminal based on the pilot signal; and
    a changing unit which changes an adjustment period in which the transmission timing is adjusted by the adjusting unit based on a transmission cycle of the pilot signal.

2. The radio base station according to claim 1, wherein the changing unit changes the adjustment period so that the adjustment period is shorter as compared with an initial setting value of the adjustment period.

3. The radio base station according to claim 2, wherein the changing unit changes the adjustment period so that the adjustment period becomes shorter as the transmission cycle of the pilot signal becomes shorter.

4. The radio base station according to claim 1, wherein the changing unit changes the adjustment period based on the transmission cycle of the pilot signal and an adjustment amount of the transmission timing.

5. The radio base station according to claim 4, wherein the changing unit changes the adjustment period in such a way that the adjustment period corresponds to a sum of a first parameter which is proportional to the adjustment amount of the transmission timing and a second parameter which is proportional to the transmission cycle of the pilot signal.

6. The radio base station according to claim 4, wherein the changing unit changes the adjustment period in such a way that the adjustment period is $TA \times k + (T \times v)/c$; an average value of the adjustment amount of the transmission timing is TA, a prescribed coefficient is k, the transmission cycle of the pilot signal is T, a moving speed of the mobile terminal is v, and an optical speed is c.

7. The radio base station according to claim 1, further comprising:
   a calculating unit which calculates an average value of an adjustment amount of the transmission timing, and
   wherein the changing unit changes the adjustment period when the average value calculated by the calculating unit is less than a first threshold value.

8. The radio base station according to claim 7, wherein the calculating unit calculates the average value of an absolute value of the adjustment amount of the transmission timing, and
   wherein the changing unit changes the adjustment period when the average value calculated by the calculating unit is less than the first threshold value.

9. The radio base station according to claim 7, wherein the calculating unit calculates a moving average value during a period of the adjustment amount of the transmission timing, and
   wherein the changing unit changes the adjustment period when the moving average value calculated by the calculating unit is less than the first threshold value.

10. The radio base station according to claim 9, wherein the calculating unit calculates a total number of times by which the moving average value is calculated after the radio base station starts communication and a moving averaging number of times for calculating the moving average value, respectively, in addition to the moving average value during the period of the transmission timing, and
    wherein the changing unit does not change the adjustment period when the total number of times is less than the moving averaging number of times.

11. The radio base station according to claim 1, further comprising:
    a detection unit which detects a processing load in the radio base station, and
    wherein the changing unit changes the adjustment period when the processing load detected by the detection unit is equal to or more than a second threshold value and does not change the adjustment period if the processing load detected by the detection unit is less than the second threshold value.

12. The radio base station according to claim 1, wherein the radio base station is a radio base station complying with a Long Term Evolution (LTE) method or a Worldwide Interoperability for Microwave Access (WiMax) method.

13. A communication method performed by a radio base station which communicates with a mobile terminal, the communication method comprising:
    acquiring a pilot signal which is discretely included in a transmission signal to be transmitted from the mobile terminal and is reference to adjust a transmission timing of the transmission signal in the mobile terminal;
    adjusting the transmission timing of the transmission signal in the mobile terminal based on the pilot signal; and
    changing the adjustment period in which the transmission timing is adjusted in the adjusting operation based on a transmission cycle of the pilot signal.

* * * * *